United States Patent
Zhu et al.

(10) Patent No.: US 9,214,214 B2
(45) Date of Patent: Dec. 15, 2015

(54) PHYSICALLY UNCLONABLE FUNCTION BASED ON THE RANDOM LOGICAL STATE OF MAGNETORESISTIVE RANDOM-ACCESS MEMORY

(71) Applicant: QUALCOMM Incorporated, San Diego, CA (US)

(72) Inventors: Xiaochun Zhu, San Diego, CA (US); Steven M. Millendorf, San Diego, CA (US); Xu Guo, San Diego, CA (US); David M. Jacobson, San Diego, CA (US); Kangho Lee, San Diego, CA (US); Seung H. Kang, San Diego, CA (US); Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/072,634

(22) Filed: Nov. 5, 2013

(65) Prior Publication Data
US 2015/0071431 A1    Mar. 12, 2015

Related U.S. Application Data

(60) Provisional application No. 61/875,617, filed on Sep. 9, 2013.

(51) Int. Cl.
*G11C 11/16* (2006.01)
*H04L 9/30* (2006.01)
*H04L 9/32* (2006.01)

(52) U.S. Cl.
CPC .......... *G11C 11/1675* (2013.01); *G11C 11/161* (2013.01); *G11C 11/1695* (2013.01); *H04L 9/30* (2013.01); *H04L 9/3278* (2013.01)

(58) Field of Classification Search
None
See application file for complete search history.

(56) References Cited

U.S. PATENT DOCUMENTS 6,958,927 B1 * 10/2005 Nguyen et al. ............... 365/158
6,992,910 B1    1/2006 Ju et al.
7,936,592 B2    5/2011 Wang et al.
(Continued)

FOREIGN PATENT DOCUMENTS

WO    WO-2004114122 A2    12/2004

OTHER PUBLICATIONS

International Search Report and Written Opinion—PCT/US2014/054096—ISA/EPO—Nov. 26, 2014.
(Continued)

*Primary Examiner* — Kaveh Abrishamkar
*Assistant Examiner* — Tri Tran
(74) *Attorney, Agent, or Firm* — Loza & Loza, LLP

(57) ABSTRACT

One feature pertains to a method of implementing a physically unclonable function (PUF). The method includes exposing an array of magnetoresistive random access memory (MRAM) cells to an orthogonal external magnetic field. The MRAM cells are each configured to represent one of a first logical state and a second logical state, and the orthogonal external magnetic field is oriented in an orthogonal direction to an easy axis of a free layer of the MRAM cells to place the MRAM cells in a neutral logical state that is not the first logical state or the second logical state. The method further includes removing the orthogonal external magnetic field to place each of the MRAM cells of the array randomly in either the first logical state or the second logical state.

30 Claims, 10 Drawing Sheets

(56) References Cited

U.S. PATENT DOCUMENTS

| | | |
|---|---|---|
| 8,089,132 B2 | 1/2012 | Zheng et al. |
| 2005/0216244 A1* | 9/2005 | Nahas ............................. 703/13 |
| 2007/0279969 A1* | 12/2007 | Gabelich ....................... 365/158 |
| 2012/0066571 A1* | 3/2012 | Marinet ......................... 714/773 |
| 2013/0161770 A1 | 6/2013 | Meng et al. |
| 2014/0126306 A1* | 5/2014 | Otterstedt et al. ....... 365/189.07 |

OTHER PUBLICATIONS

Baraji M.E., et al., "Towards an ultra-low power, high density and non-volatile Ternary CAM," 9th Annual Non-Volatile Memory Technology Symposium (NVMTS), 2008, pp. 1-7.

* cited by examiner

PHYSICALLY UNCLONABLE FUNCTION BASED ON THE RANDOM LOGICAL STATE OF MAGNETORESISTIVE RANDOM-ACCESS MEMORY

CLAIM OF PRIORITY

The present application for patent claims priority to U.S. Provisional Patent Application No. 61/875,617 entitled "PHYSICALLY UNCLONABLE FUNCTION BASED ON THE RANDOM LOGICAL STATE OF MAGNETORESISTIVE RANDOM-ACCESS MEMORY" filed Sep. 9, 2013, the entire disclosure of which is hereby expressly incorporated by reference herein.

BACKGROUND

1. Field

Various features relate to physically unclonable functions (PUFs), and in particular to PUFs based on the random logical state of magnetoresistive random-access memory (MRAM) cells.

2. Background

An on-chip PUF is a chip-unique challenge-response mechanism exploiting manufacturing process variations inside integrated circuits (ICs). When a physical stimulus (i.e., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF's "unclonability" means that each device employing the PUF has a unique and unpredictable way of mapping challenges to responses, even if one device is manufactured with the same process as another seemingly identical device. Thus, it is practically infeasible to construct a PUF with the same challenge-response behavior as another device's PUF because exact control over the manufacturing process is infeasible.

MRAM is a non-volatile random-access memory that, unlike conventional RAM, stores data not as electric charge but instead as electron spin within magnetic storage elements. FIG. 1, comprising FIGS. 1A and 1B, illustrates a schematic diagram of at least a portion of a spin transfer torque (STT) MRAM circuit cell 100 found in the prior art. The MRAM cell 100 shown in FIGS. 1A and 1B is an example of an "in-plane" STT MRAM cell. The MRAM cell 100 includes a free layer 102, a reference layer (also known as "pinned reference layer") 104, a tunnel junction layer 106, and an anti-ferromagnetic (AFM) pinning layer 108. The free layer 102 is a ferromagnetic layer whose magnetic polarity is not fixed but is instead free to change direction in response to an external magnetic field (not shown). The reference layer 104 includes a first ferromagnetic layer 105 and a second ferromagnetic layer 107 that have opposite magnetic polarities. By contrast to the free layer 102, the reference layer 104 has a magnetic polarity that is fixed such that the magnetic polarities of the first and second ferromagnetic layers 105, 107 do not change direction in the presence of the aforementioned external magnetic field. The AFM pinning layer 108 is an anti-ferromagnetic layer that controls the magnetic polarities of the reference layer 106.

Situated in between the free layer 102 and the reference layer's first ferromagnetic layer 104 is the tunnel junction layer 106. The tunnel junction layer 106 is made of a very thin insulating material, such as magnesium oxide (MgO). The tunnel junction layer 106 is so thin that electrons may actually flow through (e.g., tunnel through) the layer 106 despite the layer 106 being an insulator. The magnetic polarity direction of the free layer 102 relative to the first ferromagnetic layer 105 (e.g., parallel to each other or antiparallel to each other) represents one of two different logical data bit states (e.g. data bit "1" or data bit "0"). In the example illustrated in FIG. 1A, the parallel orientation is shown with the free layer 102 having a magnetic polarity direction that is the same as the magnetic polarity direction of the first ferromagnetic layer 105. By contrast, FIG. 1B illustrates the antiparallel orientation with the free layer 102 having a magnetic polarity direction that is the opposite of the magnetic polarity direction of the first ferromagnetic layer 105.

A signal line voltage $V_{SL}$ applied to the MRAM cell 100 controls the flow of current $I_a$ through the MRAM cell 100. For example, applying a voltage $V_{SL}$ that exceeds the transition voltage $V_T$ of the cell 100 causes the current $I_{SL}$ to flow in the direction shown in FIG. 1A and also causes the magnetic polarity of the free layer 102 to change direction into a parallel orientation. That is, the magnetic polarity direction of the free layer 102 is parallel to the magnetic polarity of the first ferromagnetic layer 105. To change the magnetic polarity direction of the free layer 102 back to an antiparallel orientation, a signal line voltage $V_{SL}$ that exceeds $V_T$ is applied in the orientation shown in FIG. 1B to cause the current $I_{SL}$ to flow in the opposite direction. In one example, the parallel state may be considered the first logical state representing a data bit "0," and the antiparallel state may be considered the second logical state representing a data bit "1."

FIG. 2 shows a top perspective schematic view of a portion of a perpendicular MRAM cell 200 found in the prior art. Like the in-plane MRAM cell 100 shown in FIGS. 1A and 1B, the perpendicular MRAM cell 200 of FIG. 2 includes a free layer 202 and a reference layer 204. The relative orientation (parallel or antiparallel) of the magnetic polarity of the free layer 202 with respect to the reference layer 204 dictates the logical state (e.g., logical "0" or "1") of the MRAM cell 200. The magnetic polarities of the perpendicular MRAM cell's 200 free layer 202 and reference layer 204 are typically oriented along a direction parallel to its perpendicular axis 203 (e.g., parallel to the y-axis shown in FIG. 3).

There exists a need for methods and apparatuses that implement PUFs based on MRAM cells. Specifically, there exists a need to provide methods and apparatuses that may implement PUFs based on the random logical states of MRAM cell arrays. Such MRAM based PUFs may provide a secure means to uniquely identify electronic devices, such as integrated circuits, and/or provide secure cryptographic keys for cryptographic security algorithms.

SUMMARY

One feature provides a method of implementing a physically unclonable function (PUF). The method comprises exposing an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state, and removing the orthogonal external magnetic field to place each of the MRAM cells of the array randomly in either the first logical state or the second logical state. According to one aspect, the method further comprises sending a challenge to the MRAM cell array that reads logical states of select MRAM cells of the array after the orthogonal external magnetic field has been removed, and obtaining a response to the challenge from the MRAM cell array that includes the logical states of the selected MRAM cells of the array. According to another aspect, the MRAM cells lack an anti-ferromagnetic (AFM) pinning layer.

According to one aspect, the logical states of the MRAM cells of the array are stored in secure memory. According to another aspect, the logical states of the MRAM cells of the array serve as a cryptographic key that uniquely identifies an electronic device. According to yet another aspect, the logical states of the MRAM cells of the array are utilized by a cryptographic security algorithm.

According to one aspect, the challenge includes MRAM cell address information, and the response includes data bit information of MRAM cells corresponding to the MRAM cell address information. According to another aspect, the array of MRAM cells are exposed to the orthogonal external magnetic field after the MRAM cells have transitioned from the first logical state to the second logical state or the second logical state to the first logical state at least once. According to yet another aspect, the MRAM cells of the array are in-plane MRAM cells, the easy axis is a long axis of the free layer of the MRAM cells, and the orthogonal external magnetic field is oriented in a direction that is parallel to a short axis of the free layer.

According to one aspect, the MRAM cells of the array are in-plane MRAM cells, the easy axis is a long axis of the free layer of the MRAM cells, and the orthogonal external magnetic field is oriented in a direction that is orthogonal to both a short axis of the free layer and the long axis of the free layer. According to another aspect, the MRAM cells of the array are perpendicular MRAM cells, and the easy axis is a perpendicular axis of the free layer of the MRAM cells.

Another feature provides an apparatus for implementing a physically unclonable function (PUF). The apparatus comprises an array of magnetoresistive random access memory (MRAM) cells, the MRAM cells each configured to represent one of a first logical state and a second logical state, and a processing circuit communicatively coupled to the array of MRAM cells and configured to expose the array of MRAM cells to an orthogonal external magnetic field oriented in an orthogonal direction to an easy axis of a free layer of the MRAM cells to place the MRAM cells in a neutral logical state that is not the first logical state or the second logical state, and remove the orthogonal external magnetic field to place each of the MRAM cells of the array randomly in either the first logical state or the second logical state. According to one aspect, the processing circuit is further configured to send a challenge to the MRAM cell array that reads logical states of select MRAM cells of the array after the orthogonal external magnetic field has been removed, and obtain a response to the challenge from the MRAM cell array that includes the logical states of the selected MRAM cells of the array.

Another feature provides an apparatus for implementing a physically unclonable function (PUF), where the apparatus comprises a means for exposing an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state, and means for removing the orthogonal external magnetic field to place each of the MRAM cells of the array randomly in either the first logical state or the second logical state. According to one aspect, the apparatus further comprises a means for sending a challenge to the MRAM cell array that reads logical states of select MRAM cells of the array after the orthogonal external magnetic field has been removed, and means for obtaining a response to the challenge from the MRAM cell array that includes the logical states of the selected MRAM cells of the array.

Another feature provides a computer-readable storage medium having one or more instructions stored thereon for implementing a physically unclonable function (PUF), the instructions, which when executed by at least one processor, causes the processor to expose an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state, and remove the orthogonal external magnetic field to place each of the MRAM cells of the array randomly in either the first logical state or the second logical state. According to one aspect, the instructions, which when executed by the processor, further cause the processor to send a challenge to the MRAM cell array that reads logical states of select MRAM cells of the array after the orthogonal external magnetic field has been removed, and obtain a response to the challenge from the MRAM cell array that includes the logical states of the selected MRAM cells of the array.

BRIEF DESCRIPTION OF DRAWINGS

FIG. 1, comprising

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Overview

Methods and apparatuses are described herein that implement PUFs based on MRAM circuit cell arrays. Specifically, the PUFs are implemented based on the random logic states of MRAM circuit cells that arise due to small physical MRAM cell variation created by the manufacturing process. Application and removal of an external magnetic field having a polarity orthogonal to the easy axis of the free layer of the MRAM cells of an MRAM array causes the MRAM cells to settle to a biased logical state that is based on the physical MRAM cell variations. These variations are random in nature and unpredictable and hence the logical states to which the MRAM cells settle after application and removal of the external magnetic field is random too. The PUF-challenge responses generated by the MRAM based PUFs may be used to uniquely identify the electronic devices and/or integrated circuits having the MRAM based PUFs. Alternatively, the responses generated by the PUFs may be used as secure cryptographic keys for cryptographic security algorithms.

Exemplary MRAM Based PUFs and Methods for Implementing the Same

Figure 3:
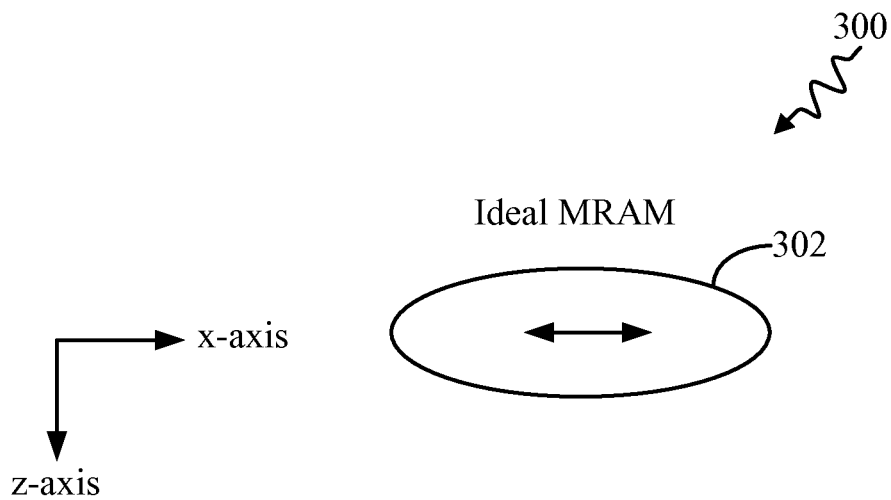
FIG. 3 illustrates a top schematic view of an ideal in-plane MRAM circuit cell.
Figure 4:
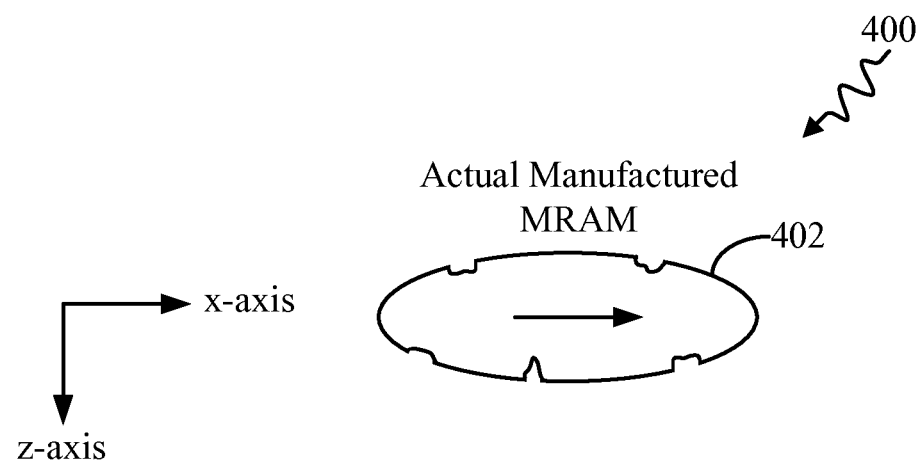
FIG. 4 illustrates a top schematic view of a manufactured in-plane MRAM circuit cell.

FIGS. 3 and 4 illustrate top schematic views of in-plane MRAM circuit cells 300, 400 according to one aspect of the disclosure. Specifically, FIG. 3 illustrates a theoretically ideal MRAM cell 300 that is manufactured flawlessly. For example, the ideal MRAM cell 300 is smooth, elliptical, and symmetrical; it does not have any rough edges or dents. As a result, in the absence of an external magnetic field the ideal MRAM cell 300 has an equal probability of having its free layer's 302 magnetic polarity settle to either direction of its long axis. That is, the magnetic polarity of the free layer 302 may point towards either the positive x-axis or the negative x-axis, and consequently it has an equal probability of settling to a first logical state (e.g., "0") or a second logical state (e.g., "1"). The same concept is true too for a perfect perpendicular MRAM cell: in the absence of an external magnetic field the ideal perpendicular MRAM cell has an equal probability of having its free layer's magnetic polarity settle to either direction of its perpendicular axis.

By contrast, FIG. 4 illustrates a more realistic manufactured MRAM cell 400 that does have imperfections. For example, the manufactured MRAM cell 400 is not perfectly symmetrical and may have rough edges, dents, and other imperfections. As a result, the manufactured MRAM cell 400 is biased such that in the absence of an external magnetic field its free layer's 402 magnetic polarity consistently settles initially to one direction of its long axis versus the other. That is, the magnetic polarity of the free layer 402 initially points towards one of the positive x-axis or the negative x-axis more consistently than the other. Consequently, the manufactured MRAM cell 400 has a greater probability of initially settling to one logical state (e.g., the first logical state "0") versus the other logical state (e.g., the second logical state "1"). The same concept is true too for an manufactured, imperfect perpendicular MRAM cell: in the absence of an external magnetic field the imperfect perpendicular MRAM cell consistently settles initially to one direction of its perpendicular axis than the other.

MRAM based PUFs are described herein that take advantage of the aforementioned manufacturing based MRAM cell variation within an MRAM array to, for example, uniquely and distinctively identify one MRAM cell array (or an electronic device having the MRAM cell array) versus another even if the arrays are attempted to be manufactured the same.

Removal of AFM Pinning Layer

Figures 1A, 1B:
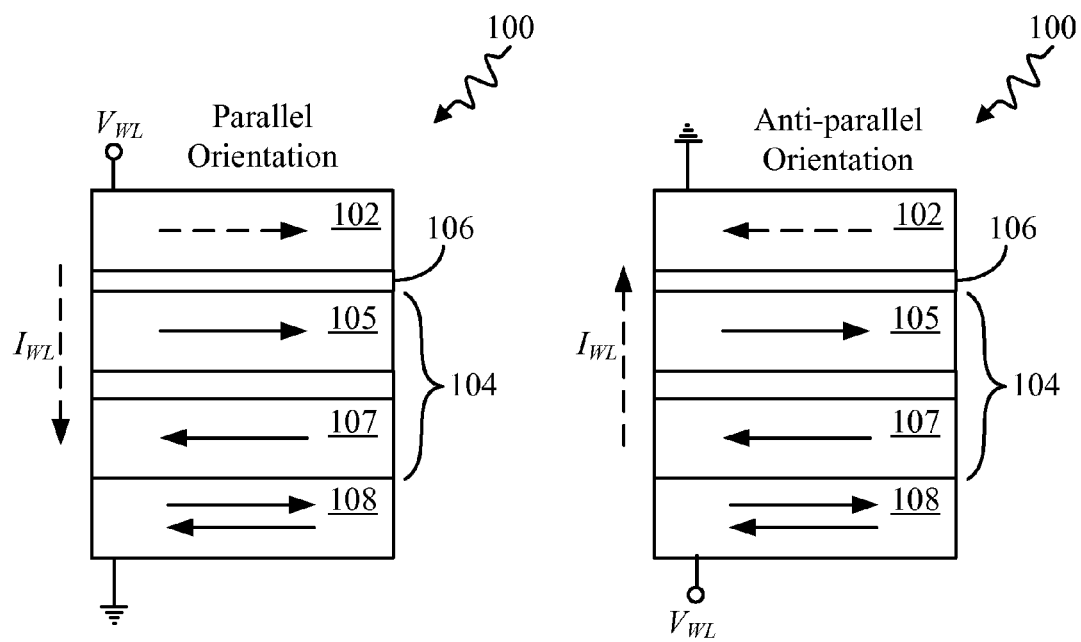
FIGS. 1A and 1B, illustrates a schematic diagram of at least a portion of a spin transfer torque (STT) MRAM circuit cell found in the prior art.
Figure 2:
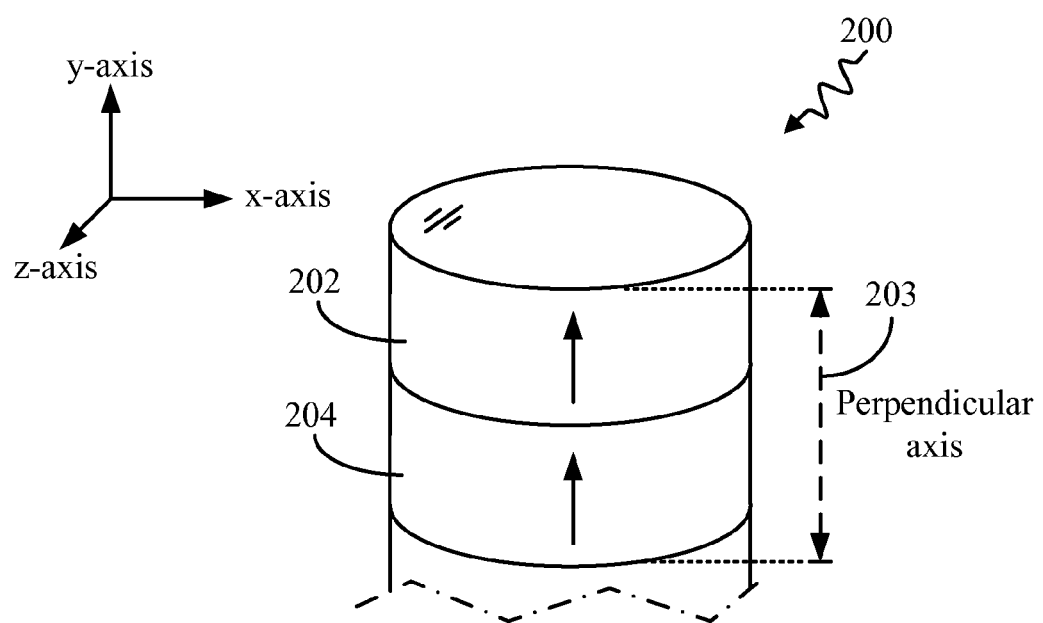
FIG. 2 illustrates a top perspective schematic view of a portion of a perpendicular MRAM cell found in the prior art.
Figure 5:
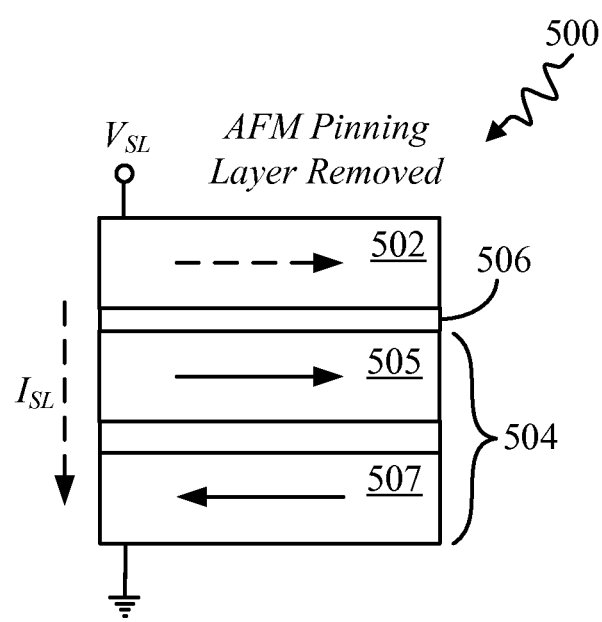
FIG. 5 illustrates a schematic diagram of an in-plane MRAM cell.

FIG. 5 illustrates a schematic diagram of an in-plane MRAM cell 500 according to another aspect of the disclosure. The MRAM cell 500 includes the free layer 502, the reference layer 504, and the tunnel junction layer 506. The reference layer 504 includes the first ferromagnetic layer 505 and the second ferromagnetic layer 507. Notably, the MRAM cell 500 does not have an AFM pinning layer 108 (see FIGS. 1A and 1B). Referring to FIG. 5, since the MRAM cell 500 lacks the AFM pinning layer the magnetic polarities of the first and second ferromagnetic layers 505, 507—although always opposite each other—may not have to be pinned to one particular orientation (i.e., they may point either left or right in FIG. 5). The magnetic polarity of the free layer 502 may still be antiparallel or parallel to the magnetic polarity of the first ferromagnetic layer 505 though despite the missing AFM pinning layer. Removing the AFM pinning layer may help reduce costs and simplify manufacturing.

Apply Orthogonal External Magnetic Field

Figure 6:
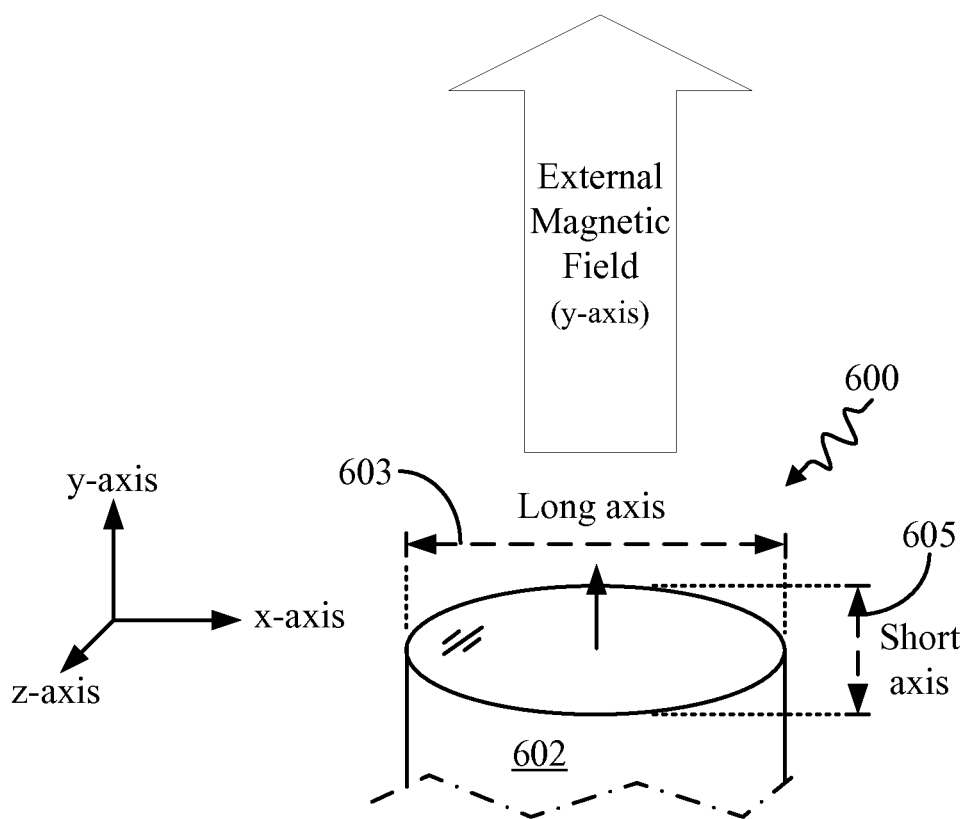
FIG. 6 illustrates a top perspective schematic view of an in-plane MRAM cell.

FIG. 6 shows a top perspective schematic view of an in-plane MRAM cell 600 according to one aspect of the disclosure. After manufacturing of the MRAM cell 600 is complete and/or at some point after the MRAM cells have undergone logical state transitions during use, an external magnetic field is applied to the MRAM cell 600 (as well as a plurality of other similar MRAM cells within the MRAM cell array (array not shown)) in a direction that is orthogonal to the easy axis (e.g., long axis 603, which is parallel to the x-axis shown in FIG. 6) of the MRAM cell's free layer 602. In the illustrated example, the external magnetic field is oriented parallel to the y-axis, which is orthogonal to the easy axis of the free layer 602. Alternatively, the external magnetic field may instead be oriented parallel to the short axis 605 of the free layer 602 (the short axis 605 being parallel to the z-axis shown in FIG. 6), which is also orthogonal to the easy axis of the free layer 602. Application of the external magnetic field temporarily causes the MRAM cell array's free layers to have a magnetic polarity that is aligned with the external magnetic field's direction, and thus also be orthogonal to the free layer's 602 long axis 603. While in such a state, the MRAM cell 600 is in a neutral logical state that is neither a first logical "0" state or a second logical "1" state.

Upon removal of the orthogonal external magnetic field, the MRAM cell 600 will randomly settle to one of the two possible logical states (e.g., first logical state "0" or second logical state "1"). The specific logical state each MRAM cell 600 settles to will be controlled by the individual bias each MRAM cell 600 has towards a certain logical state value. Thus, if the manufacturing imperfections of the MRAM cell 600 cause the cell 600 to have a bias towards the first logical state "0," then upon removal of the orthogonal external magnetic field the MRAM cell 600 will naturally settle to the first logical state "0." The application and removal of the orthogonal external magnetic field may be performed at any point in time, for example after manufacturing is complete and/or after the MRAM cells 600 have been transitioned logical states (i.e., programmed) once or a plurality of times.

Figure 7:
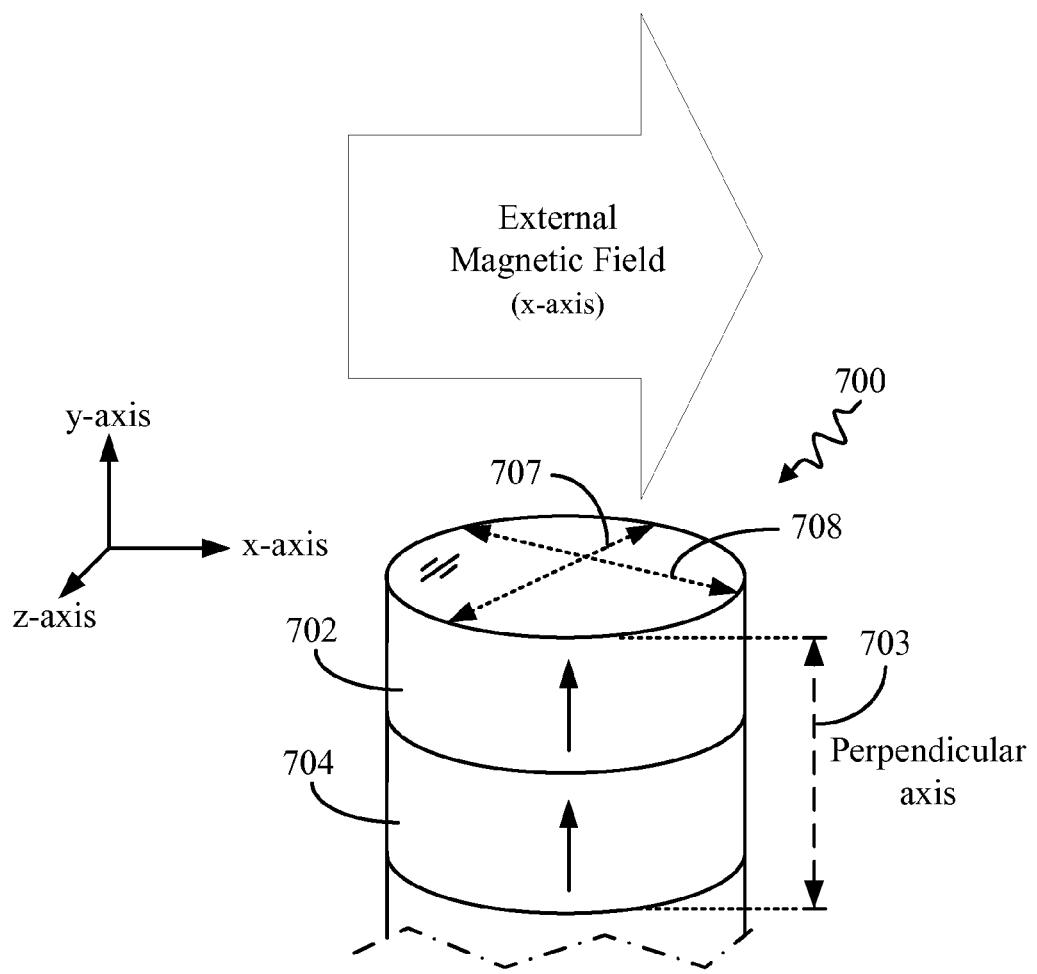
FIG. 7 illustrates a top perspective schematic view of a perpendicular MRAM cell.

FIG. 7 illustrates a top perspective schematic view of a perpendicular MRAM cell 700 that may be part of an MRAM cell array according to one aspect of the disclosure. Like the in-plane MRAM cell 600 shown and described above with reference to FIG. 6, the perpendicular MRAM cell 700 may also be subjected to an external magnetic field in a direction that is orthogonal to the easy axis of the MRAM cell's free layer 702. For the case of the perpendicular MRAM cell 700, the external magnetic field may be oriented parallel to the x-axis, which is orthogonal to the easy axis (i.e., perpendicular axis 703) of the free layer 702. The external magnetic field may also be oriented parallel to the z-axis, which is also orthogonal to the x-axis. In fact, the external magnetic field may have directional components in both the x-axis and z-axis, and thus be parallel, for example, to the directions 707, 708 shown in FIG. 7, and still be orthogonal to the perpendicular axis 703. Application of the external magnetic field temporarily causes the MRAM cell array's free layers to have a magnetic polarity that is aligned with the external magnetic field's direction, and thus also be orthogonal to the free layer's perpendicular axis 703. While in such a state, the MRAM cell 700 is in a neutral logical state that is neither a first logical "0" state or a second logical "1" state.

Upon removal of the orthogonal external magnetic field, the MRAM cell 700 will randomly settle to one of the two possible logical states (e.g., first logical state "0" or second logical state "1"). The specific logical state each MRAM cell 700 settles to will be controlled by the individual bias each MRAM cell 700 has towards a certain logical state value. Thus, if the manufacturing imperfections of the MRAM cell 700 cause the cell 700 to have a bias towards the first logical state "0," then upon removal of the orthogonal external magnetic field the MRAM cell 700 will naturally settle to the first logical state "0." The application and removal of the orthogonal external magnetic field may be performed at any point in time, for example after manufacturing is complete and/or after the MRAM cells 700 have been transitioned logical states (i.e., programmed) once or a plurality of times.

In this fashion, upon removal of the orthogonal external magnetic field each of the MRAM cells with the MRAM cell array will settle to their own biased logical state value. These logical state values are random and unique to each MRAM cell array and therefore may be used as a basis for a PUF. For example the random and unique logical state values may be used to generate a cryptographic security key and/or serve as a unique device/integrated circuit identifier that houses the MRAM cell array.

Figure 8:
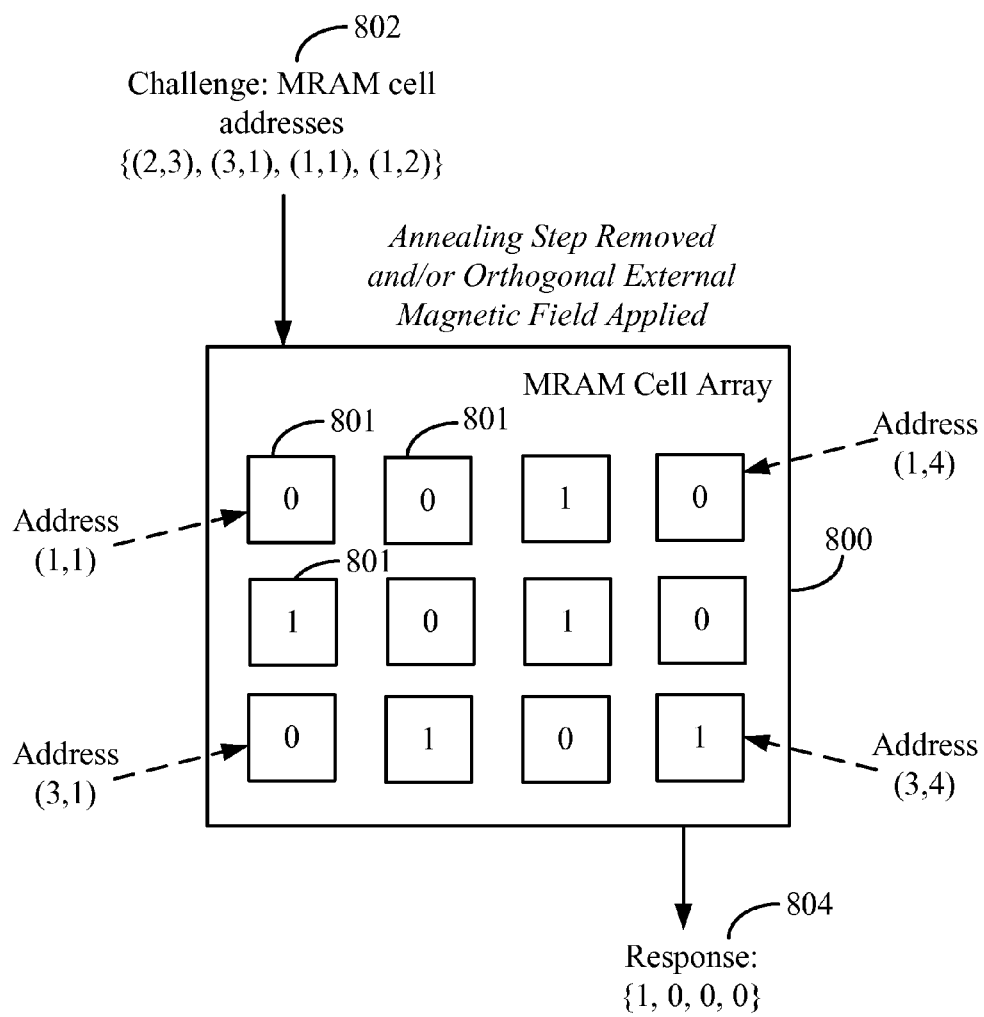
FIG. 8 illustrates an exemplary challenge-response system using the MRAM based PUF.

FIG. 8 illustrates an exemplary challenge-response system using the MRAM based PUF according to one aspect. A challenge 802 may be received at the MRAM based PUF that includes MRAM cell address information. That is, the challenge 802 may specify which MRAM cell address locations are to be read. In the illustrated example, the challenge 802 specifies that address locations {(2,3), (3,1), (1,1), (1,2)} of the MRAM array 800 are to be read. The MRAM array 800 includes a plurality of MRAM cells 801 that have random logical states because the MRAM array 800 has undergone application and removal of the orthogonal external magnetic field as described with reference to FIGS. 6 and 7. The MRAM cells 801 may also lack an AFM pinning layer and have the structure of the MRAM cell 500 described with referenced to FIG. 5.

In response 804 to the challenge 802, the logical states of the MRAM cell address locations are read/retrieved. The resulting logical states read from the MRAM cells 801 is the response 804 to the challenge 802 issued. The resulting logical states are unique in that other MRAM cell arrays, even if attempted to be manufactured identical, will vary in their logical state responses given the same challenge due to uncontrollable manufacturing variation.

As one example, the response 804 may be used as a cryptographic key that uniquely identifies an electronic device and/or the integrated circuit that houses the MRAM cell array 800. As another example, the response 804 may be used as a random, unique key in a cryptographic security algorithm, such as a private key in a public-private key encryption algorithm.

Figure 9:
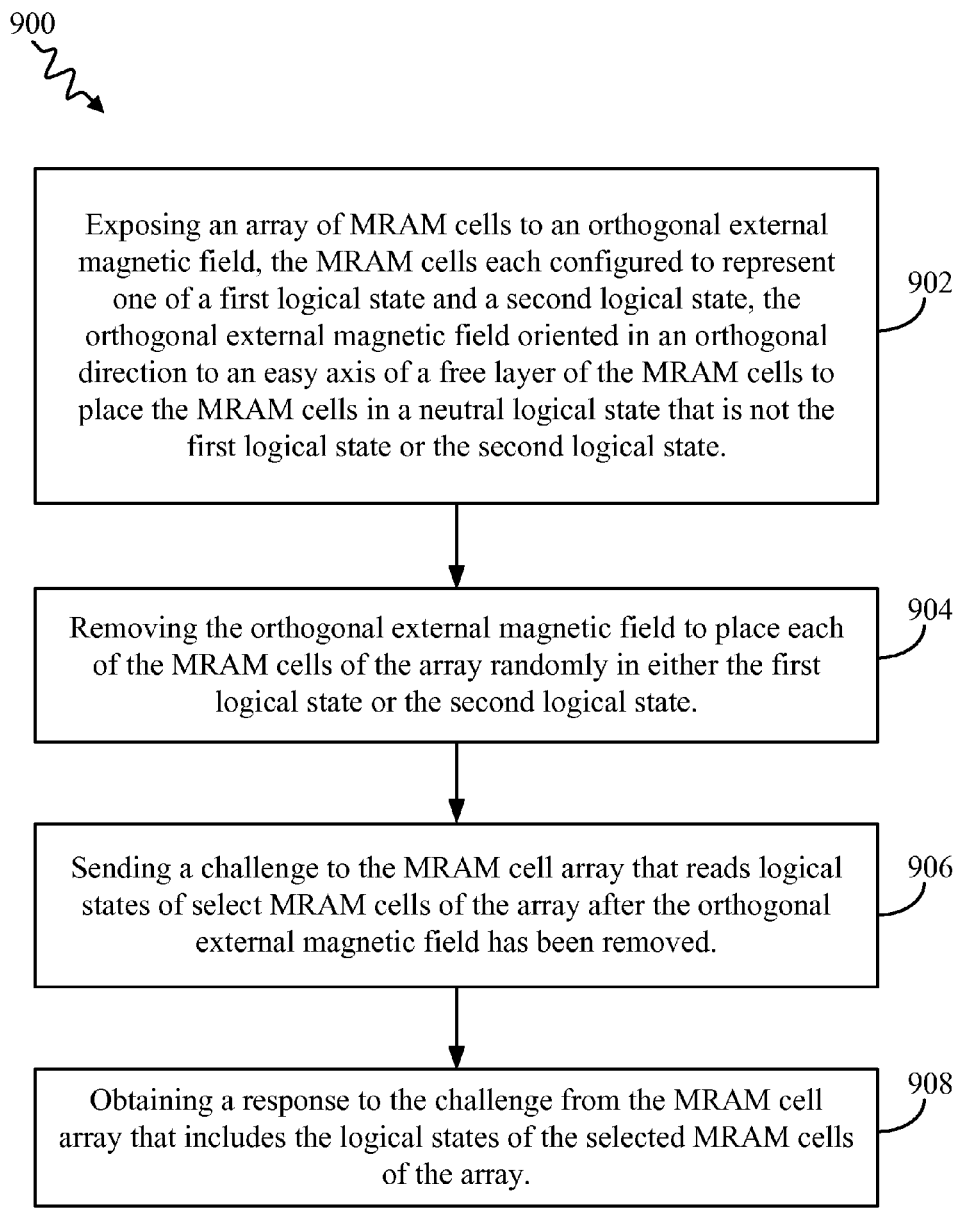
FIG. 9 illustrates a flow diagram of a method for implementing an MRAM based PUF.

FIG. 9 illustrates a flow diagram 900 of a method for implementing an MRAM based PUF according to one aspect. First, an array of MRAM cells are exposed to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state 902. Then, the orthogonal external magnetic field is removed to place each of the MRAM cells of the array randomly in either the first logical state or the second logical state 904. Next, a challenge is sent to the MRAM cell array that reads logical states of select MRAM cells of the array after the orthogonal external magnetic field has been removed 906. Then, a response to the challenge is obtained from the MRAM cell array that includes the logical states of the selected MRAM cells of the array 908.

Exemplary Electronic Device

Figure 10:
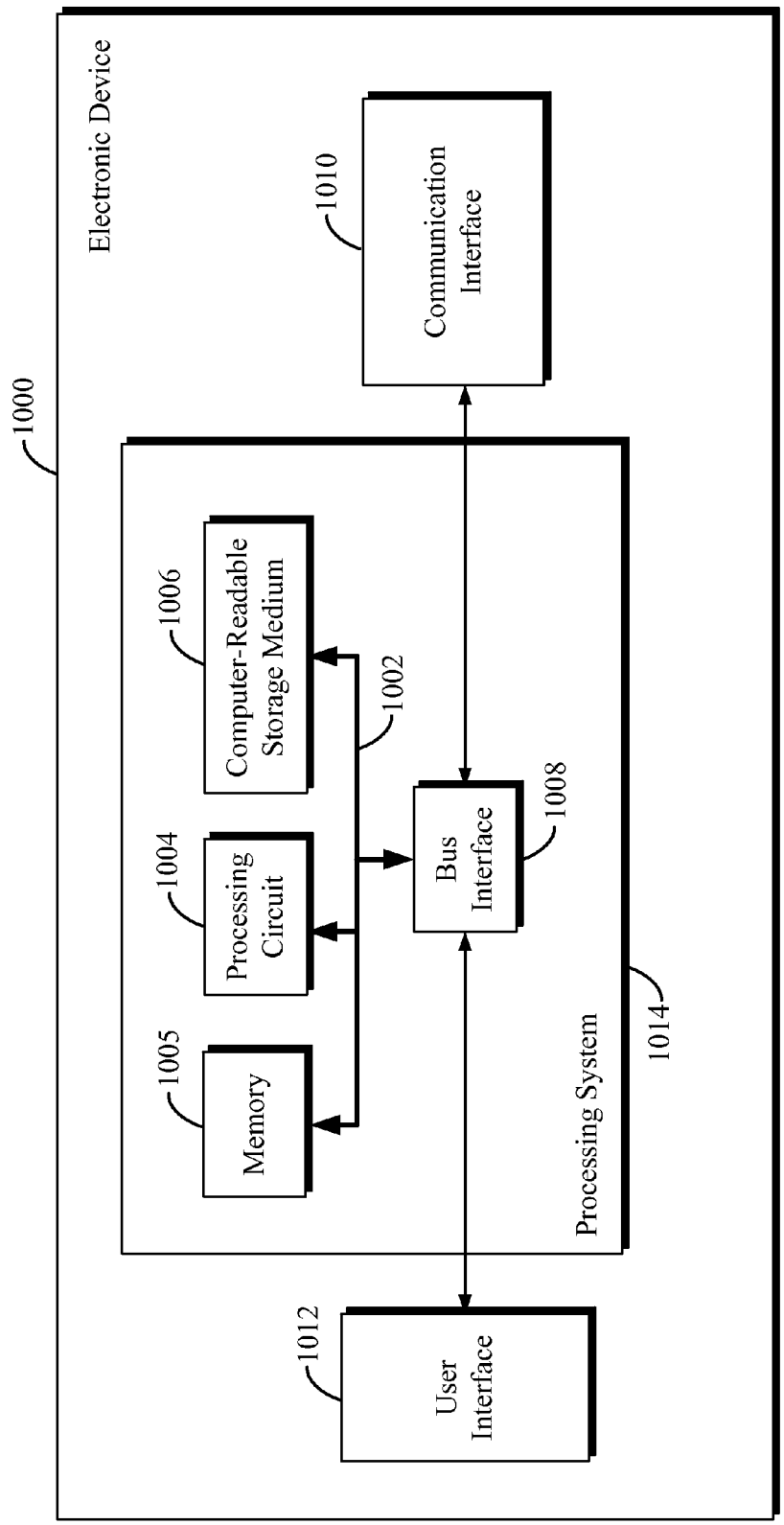
FIG. 10 illustrates an exemplary schematic block diagram of a hardware implementation for an electronic device that includes MRAM based PUF(s).

FIG. 10 illustrates an exemplary schematic block diagram of a hardware implementation for an electronic device 1000 that may include the MRAM based PUFs described herein. The electronic device 1000 may be a mobile phone, smartphone, tablet, portable computer, and or any other electronic device having circuitry. The electronic device 1000 may include a communication interface 1010, a user interface 1012, and a processing system 1014. The processing system 1014 may include a processing circuit (e.g., processor) 1004, a memory circuit (e.g., memory) 1005, a computer-readable storage medium 1006, a bus interface 1008, and a bus 1002. The processing system 1014 and/or the processing circuit 1004 may be configured to perform any of the steps, functions, and/or processes described above and also those steps depicted in FIG. 9 and/or described with respect to FIGS. 6, 7, and/or 8.

The processing circuit 1004 may be one or more processors (e.g., first processor, etc.) that are adapted to process data for the electronic device 1000. For example, the processing circuit 1004 may be a specialized processor, such as an application specific integrated circuit (ASIC) that serves as a means for carrying out any one of the steps described in FIG. 9 and/or described with respect to FIGS. 6, 7, and/or 8.

Examples of processing circuits 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1004 is also responsible for managing the bus 1002, and executing software stored on the computer-readable storage medium 1006 and/or memory 1005. The software, when executed by the processing circuit 1004, causes the processing system 1014 to perform the various functions, steps, and/or processes described above with respect to FIG. 9 and/or described with respect to FIGS. 6, 7, and/or 8. The computer-readable storage medium 1006 may be used for storing data that is manipulated by the processing circuit 1004 when executing software.

The memory circuit 1005 may be non-volatile memory, such as but not limited to FLASH memory, magnetic or optical hard disk drives, etc. The memory circuit 1005 may include the MRAM arrays described herein that are PUFs. For example, a portion of the memory circuit 1005 may be any one of the MRAM based PUFs depicted in FIGS. 5, 6, 7, and/or 8.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and the communication interface 1010 (if present). The communication interface 1010 provides a means for communicating with other apparatus over a transmission medium. Depending upon the nature of the apparatus, a user interface 1012 (e.g., keypad, display, speaker, microphone, touch-screen display, etc.) may also be provided for the electronic device 1000.

Figure 11:
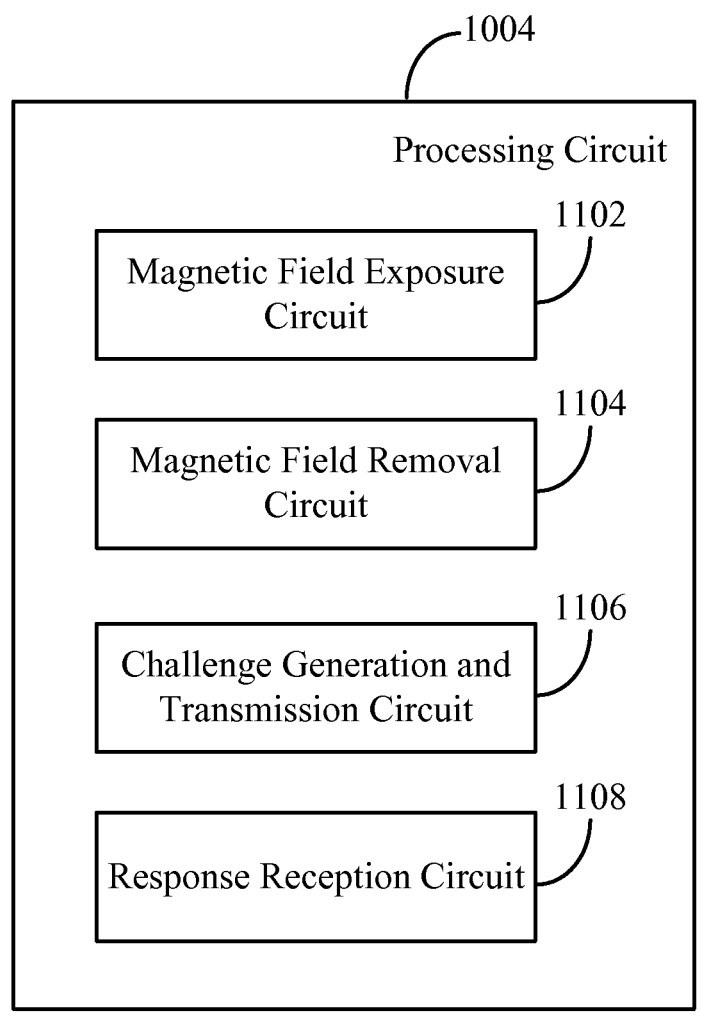
FIG. 11 illustrates a schematic block diagram of the processing circuit of an electronic device that includes MRAM based PUF(s).

FIG. 11 illustrates a schematic block diagram of the processing circuit 1004 according to one aspect of the disclosure. The processing circuit 1004 may include a magnetic field exposure circuit 1102, a magnetic field removal circuit 1104, a challenge generation and transmission circuit 1106, and a response reception circuit 1108. According to one example, the circuits 1102, 1104, 1106, 1108 may be communicatively coupled to one another through, for example, a bus architecture or through direct electrical wire coupling.

The magnetic field exposure circuit 1102 may be, according to one example, a hard wired ASIC that is capable of exposing an array of MRAM cells to an orthogonal external magnetic field. Thus, the magnetic field exposure circuit 1102 represents at least one means for exposing an array of MRAM cells to an orthogonal external magnetic field.

The magnetic field removal circuit 1104 may be, according to one example, a hard wired ASIC that is capable of removing the orthogonal external magnetic field to place each of the MRAM cells of the array randomly in either the first logical state or the second logical state. Thus, the magnetic field removal circuit 1104 represents at least one means for removing the orthogonal external magnetic field to place each of the MRAM cells of the array randomly in either the first logical state or the second logical state.

The challenge generation and transmission circuit 1106 may be, according to one example, a hard wired ASIC that is capable of generating and sending a challenge to the MRAM cell array that reads logical states of select MRAM cells of the array after the orthogonal external magnetic field has been removed. Thus, the challenge generation and transmission circuit 1106 represents at least one example of a means for sending a challenge to the MRAM cell array that reads logical states of select MRAM cells of the array after the orthogonal external magnetic field has been removed.

The response reception circuit 1108 may be, according to one example, a hard wired ASIC that is capable of obtaining a response to the challenge from the MRAM cell array that includes the logical states of the selected MRAM cells of the array. Thus, the response reception circuit 1108 represents at least one example of a means for obtaining a response to the challenge from the MRAM cell array that includes the logical states of the selected MRAM cells of the array.

One or more of the components, steps, features, and/or functions illustrated in FIGS. 3, 4, 5, 6, 7, 8, 9, 10, and/or 11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 5, 6, 7, 8, 10, and/or 11 may be configured to perform one or more of the methods, features, or steps described in FIG. 9. The algorithms described herein may also be efficiently implemented in software and/or embedded in hardware.

Moreover, in one aspect of the disclosure, the processing circuit 1004 illustrated in FIGS. 10 and 11 may be a specialized processor (e.g., an application specific integrated circuit (e.g., ASIC)) that is specifically designed and/or hard-wired to perform the algorithms, methods, and/or steps described in FIG. 9. Thus, such a specialized processor (e.g., ASIC) may be one example of a means for executing the algorithms, methods, and/or steps described in FIG. 9. The computer-readable storage medium 1006 may also store processor 1004 readable instructions that when executed by a specialized processor (e.g., ASIC) causes the specialized processor to perform the algorithms, methods, and/or steps described in FIG. 9.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of implementing a physically unclonable function (PUF), the method comprising:
   exposing an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state;
   removing the orthogonal external magnetic field to place each of the MRAM cells of the array in either the first logical state or the second logical state based on random biases arising due to physical variations unique to the array; and
   reading logical states of select MRAM cells of the array after the orthogonal external magnetic field has been removed to obtain values indicative of the array.

2. The method of claim 1, further comprising:
   sending a challenge to the MRAM cell array that reads the logical states of the select MRAM cells of the array after the orthogonal external magnetic field has been removed;
   obtaining a response to the challenge from the MRAM cell array that includes the logical states of the selected MRAM cells of the array to obtain the values indicative of the array; and
   exploiting the response to uniquely identify an electronic device associated with the MRAM cell.

3. The method of claim 1, wherein the MRAM cells lack an anti-ferromagnetic (AFM) pinning layer.

4. The method of claim 1, wherein the logical states of the MRAM cells of the array are stored in secure memory.

5. The method of claim 1, wherein the logical states of the MRAM cells of the array serve as a cryptographic key that uniquely identifies an electronic device.

6. The method of claim 1, wherein the logical states of the MRAM cells of the array are utilized by a cryptographic security algorithm.

7. The method of claim 1, wherein the challenge includes MRAM cell address information, and the response includes data bit information of MRAM cells corresponding to the MRAM cell address information.

8. The method of claim 1, wherein the array of MRAM cells are exposed to the orthogonal external magnetic field after the MRAM cells have transitioned from the first logical state to the second logical state or the second logical state to the first logical state at least once.

9. The method of claim 1, wherein the MRAM cells of the array are in-plane MRAM cells, the easy axis is a long axis of the free layer of the MRAM cells, and the orthogonal external magnetic field is oriented in a direction that is parallel to a short axis of the free layer.

10. The method of claim 1, wherein the MRAM cells of the array are in-plane MRAM cells, the easy axis is a long axis of the free layer of the MRAM cells, and the orthogonal external magnetic field is oriented in a direction that is orthogonal to both a short axis of the free layer and the long axis of the free layer.

11. The method of claim 1, wherein the MRAM cells of the array are perpendicular MRAM cells, and the easy axis is a perpendicular axis of the free layer of the MRAM cells.

12. An apparatus for implementing a physically unclonable function (PUF), the apparatus comprising:
an array of magnetoresistive random access memory (MRAM) cells, the MRAM cells each configured to represent one of a first logical state and a second logical state; and
a processing circuit communicatively coupled to the array of MRAM cells and configured to
expose the array of MRAM cells to an orthogonal external magnetic field oriented in an orthogonal direction to an easy axis of a free layer of the MRAM cells to place the MRAM cells in a neutral logical state that is not the first logical state or the second logical state,
remove the orthogonal external magnetic field to place each of the MRAM cells of the array in either the first logical state or the second logical state based on random biases arising due to physical variations unique to the array, and
read logical states of select MRAM cells of the array after the orthogonal external magnetic field has been removed to obtain values indicative of the array.

13. The apparatus of claim 12, wherein the processing circuit is further configured to:
send a challenge to the MRAM cell array that reads the logical states of the select MRAM cells of the array after the orthogonal external magnetic field has been removed;
obtain a response to the challenge from the MRAM cell array that includes the logical states of the selected MRAM cells of the array to obtain the values indicative of the array; and
exploit the response to uniquely identify an electronic device associated with the MRAM cell.

14. The apparatus of claim 12, wherein the MRAM cells lack an anti-ferromagnetic (AFM) pinning layer.

15. The apparatus of claim 12, wherein the logical states of the MRAM cells of the array serve as a cryptographic key that uniquely identifies an electronic device.

16. The apparatus of claim 12, wherein the challenge includes MRAM cell address information, and the response includes data bit information of MRAM cells corresponding to the MRAM cell address information.

17. The apparatus of claim 12, wherein the MRAM cells of the array are in-plane MRAM cells, the easy axis is a long axis of the free layer of the MRAM cells, and the orthogonal external magnetic field is oriented in a direction that is parallel to a short axis of the free layer.

18. The apparatus of claim 12, wherein the MRAM cells of the array are perpendicular MRAM cells, and the easy axis is a perpendicular axis of the free layer of the MRAM cells.

19. An apparatus for implementing a physically unclonable function (PUF), the apparatus comprising:
means for exposing an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state;
means for removing the orthogonal external magnetic field to place each of the MRAM cells of the array in either the first logical state or the second logical state based on random biases arising due to physical variations unique to the array; and
means for reading logical states of select MRAM cells of the array after the orthogonal external magnetic field has been removed to obtain values indicative of the array.

20. The apparatus of claim 19, further comprising:
means for sending a challenge to the MRAM cell array that reads the logical states of the select MRAM cells of the array after the orthogonal external magnetic field has been removed;
means for obtaining a response to the challenge from the MRAM cell array that includes the logical states of the selected MRAM cells of the array to obtain the values indicative of the array; and
means exploiting the response to uniquely identify an electronic device associated with the MRAM cell.

21. The apparatus of claim 19, wherein the logical states of the MRAM cells of the array serve as a cryptographic key that uniquely identifies an electronic device.

22. The apparatus of claim 19, wherein the array of MRAM cells are exposed to the orthogonal external magnetic field after the MRAM cells have been written to at least once.

23. The apparatus of claim 19, wherein the MRAM cells of the array are in-plane MRAM cells, the easy axis is a long axis of the free layer of the MRAM cells, and the orthogonal external magnetic field is oriented in a direction that is parallel to a short axis of the free layer.

24. The apparatus of claim 19, wherein the MRAM cells of the array are perpendicular MRAM cells, and the easy axis is a perpendicular axis of the free layer of the MRAM cells.

25. A non-transitory computer-readable storage medium having one or more instructions stored thereon for implementing a physically unclonable function (PUF), the instructions, which when executed by at least one processor, causes the processor to:
expose an array of magnetoresistive random access memory (MRAM) cells to an orthogonal external magnetic field, the MRAM cells each configured to represent one of a first logical state and a second logical state, the orthogonal external magnetic field oriented in an orthogonal direction to an easy axis of a free layer of the MRAM cells to place the MRAM cells in a neutral logical state that is not the first logical state or the second logical state;
remove the orthogonal external magnetic field to place each of the MRAM cells of the array in either the first logical state or the second logical state based on random biases arising due to physical variations unique to the array; and read logical states of select MRAM cells of the array after the orthogonal external magnetic field has been removed to obtain values indicative of the array.

26. The computer-readable storage medium of claim 25, wherein the instructions, which when executed by the processor, further cause the processor to:
send a challenge to the MRAM cell array that reads the logical states of the select MRAM cells of the array after the orthogonal external magnetic field has been removed;
obtain a response to the challenge from the MRAM cell array that includes the logical states of the selected MRAM cells of the array to obtain the values indicative of the array; and
exploit the response to uniquely identify an electronic device associated with the MRAM cell for PUF.

27. The computer-readable storage medium of claim 25, wherein the logical states of the MRAM cells of the array serve as a cryptographic key that uniquely identifies an electronic device.

28. The computer-readable storage medium of claim 25, wherein the array of MRAM cells are exposed to the orthogonal external magnetic field after the MRAM cells have been written to at least once.

29. The computer-readable storage medium of claim 25, wherein the MRAM cells of the array are in-plane MRAM cells, the easy axis is a long axis of the free layer of the MRAM cells, and the orthogonal external magnetic field is oriented in a direction that is parallel to a short axis of the free layer.

30. The computer-readable storage medium of claim 25, wherein the MRAM cells of the array are perpendicular MRAM cells, and the easy axis is a perpendicular axis of the free layer of the MRAM cells.

* * * * *